Patented Nov. 13, 1934

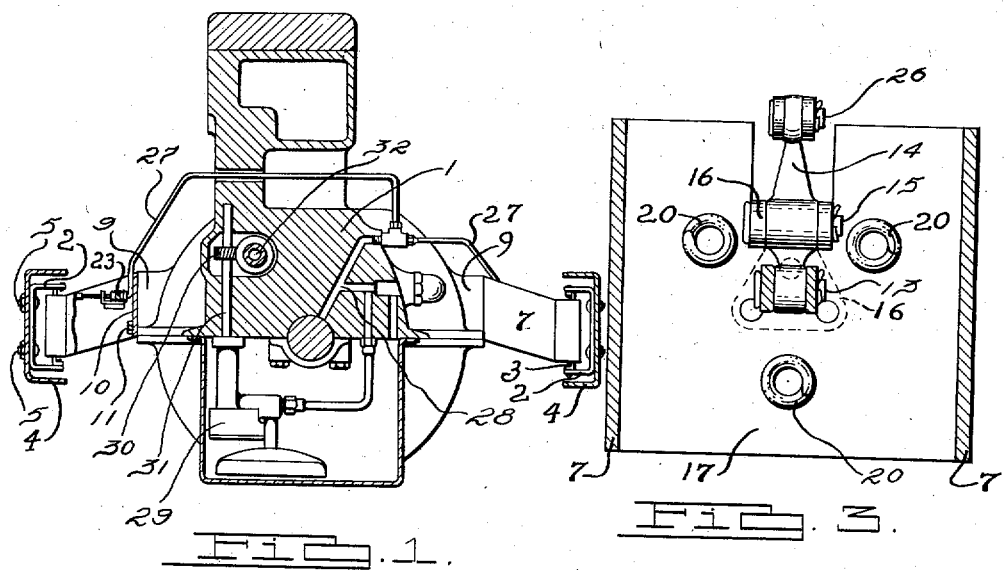

1,980,541

UNITED STATES PATENT OFFICE

1,980,541

HYDRAULIC CONTROL FOR MOTOR MOUNTINGS

Roger K. Lee, Highland Park, Mich., assignor to Chrysler Corporation, Detroit, Mich., a corporation of Delaware Application September 18, 1930, Serial No. 482,783

14 Claims. (Cl. 123—192)

This invention relates to an improved mounting for engines of the type used in vehicles.

In order to prevent the transmission of vibratory impulses from an engine of a vehicle to the chassis frame thereof, it has been found desirable to support the engine upon yieldable mountings including material such as rubber. These mountings absorb the vibration but they also permit limited relative movement between the engine and frame, the yieldability of the mountings determining the degree of movement allowed. To prevent excessive movement of the motor it is sometimes necessary to sacrifice the vibration absorbing capacities of the mountings. The tendency towards twisting movement of the motor with respect to the frame is greater at low speed operation of the vehicle than at high speed operation thereof because of the load or torsional resistance to which the motor is subjected in overcoming the starting load or torque during low speeds of the vehicle. Hence, mountings which have yielding properties that are suited for low speed operation are not as yieldable as they might be for high speed operations.

The main objects of the invention are to provide yieldable vibration absorbing mountings for an internal combustion engine in which relative movement of the engine to the support upon which it is mounted may be controlled; to provide frictional means which coact with the motor mounting in decreasing the relative movement of the frame and engine; to provide hydraulic control mechanism for varying the effective force of the frictional means; and to provide hydraulic controlling apparatus of this kind which is operated by pressure of the lubricating system of the engine so as to release the friction means during high pressure stages in the lubricating system which occur at high speed operation of an engine and to apply the frictional means during the low pressure stages of the lubricating system which occur at low speed operation of the engine.

An illustrative embodiment of my invention is shown in the accompanying drawing, in which:

Fig. 1 is a transverse section of a vehicle chassis showing an internal combustion engine which is supported on mountings embodying my invention.

Fig. 2 is an enlarged, fragmentary section of a controllable motor mounting showing the mechanism by which it is operated in detail.

Fig. 3 is a vertical section taken on line 3—3 of Fig. 2.

Fig. 4 is a horizontal section taken on line 4—4 of Fig. 2.

In the form shown, my improved motor mountings are illustrated in connection with an internal combustion engine 1 of the type used in vehicles. Substantially the same construction however, may be advantageously used in supporting motors or other prime movers of a stationary type. The mountings include a support which comprises a pair of channel shaped members 2 and 3 arranged, as shown in Fig. 2, so that their side flanges extend inwardly with respect to a channel shaped side member 4 of a vehicle chassis frame. The web of the outer channel shaped member 2 of the motor mounting support is firmly secured to the web of the side member 4 of the chassis frame by bolts 5 and 70 the support itself is substantially confined within the side member 4.

Located between the webs of the channel members 2 and 3 of the motor mounting support is a block of yieldable material 6 preferably comprising rubber which is vulcanized to the adjacent surfaces of the channel members 2 and 3. A channel shaped bracket 7 having a web 8 which extends through the central portion of the rubber block 6 is provided for attachment to the motor arm 9. The sides of the bracket extend inwardly with respect to the vehicle frame and have flanges 10 on their inner extremities which are secured to the extremities of the motor arms 9 by bolts 11 and the web 8 is preferably bonded by vulcanization to the rubber block 6. With this construction the engine 1 is yieldably mounted on the frame and limited relative movement between the frame and the engine is permitted. The rubber block 6 absorbs vibratory impulses thereby preventing shock and vibration which occurs during operation of the engine from being transmitted to the chassis frame and to the vehicle body, not shown, mounted thereon.

The above motor mounting is equipped with frictional means for limiting the relative movement of the frame and engine which has automatic control mechanism for varying the frictional resistance to the relative movement in inverse proportion to the speed of the operation of the engine. The frictional retarding means includes a variable shoe 12 which is pivotally mounted at 13 on the lower end of a lever 14, the lever 14 being pivoted at 15 on a lug 16 which is carried by a transverse plate 17 located between the sides of the bracket 7, as shown in Fig. 4. The plate 17 has edge flanges 18 which are rigidly secured by rivets 19 to the sides of the bracket. Coil springs 20 located between the plate 17 and shoe 12 normally urge the shoe to the left as viewed in Fig. 2, so as to hold it in frictional engagement with a layer of frictional material 21, such as brake or clutch lining, which is secured to the outer side of the shoe 12 by rivets 12'.

Mounted between the sides of the bracket 7 is a channel shaped bracket 22 on which is seated an expansible bellows 23. The right end of the bellows is rigidly attached to the right side 24 of the bracket 22 and the left end of the bellows carries a rod 25 which is slidably mounted in an aperture 26 in the left side 27 of the bracket 22. The outer end of the rod 25 is pivotally attached at 26 to the upper end of the lever 14 and the interior of the bellows communicates through a conduit 27 with the pressure lubricating system 28 of the engine 1. This system is supplied with lubricant under pressure by an oil pump 29 which is mechanically driven through a pinion 30 and shaft 31, by the cam shaft 32 of the engine. During operation of the engine, the pump 29 retains the lubricant in the system under pressure and feeds lubricant under pressure to the interior of the bellows 23.

In the illustration shown, the engine 1 has a pair of substantially diametrically opposite motor arms, each being yieldably connected with a side member of the chassis frame by a motor mounting of the construction described above. As these mountings are substantially identical in form, the parts differing only in that they are reversed as to left and right, the same numerals have been applied to corresponding parts of the structure. The bellows of each motor mounting communicates with the lubricating system 28 of the engine and therefore the control apparatus of the frictional retarding means of both mountings are simultaneously subjected to substantially the same pressure by the lubricant of the system.

In operation, when the engine 1 is operated at low speeds as for example, during starting of a vehicle, a considerable torque is applied on the rubber block 6 by the brackets 7 of the motor mountings. This torque tends to cause excessive movement between the engine and the chassis frame. At low speed operation of the engine however, the pressure in the lubricating system is low enough to permit the springs 20 to urge the shoe 12 toward the friction element 21 with sufficient force to frictionally resist relative movement between the rigid parts of the mounting. As the speed of the engine is increased the pressure in the lubricating system is correspondingly increased and the bellows 23 are expanded. This action of the bellows causes the rod 25 to be moved to the left as viewed in Fig. 2, thereby rotating the lever 14 in a counterclockwise direction about its pivotal axis 15. The lever 14 moves the shoe 12 to the right as viewed in Fig. 2, against the action of the springs 20 thereby gradually decreasing the force of friction applied by the shoe 12 upon the friction element 21. At a predetermined speed of engine operation, the shoe 12 is fully retracted from engagement with the friction element 21 so that during this stage of engine operation the frictional retarding mechanism is inoperative thereby causing the rubber block 6 to become the main factor in limiting movement between the engine 1 and the chassis frame in which it is mounted. In this manner, the application of the frictional retarding means is controlled so as to gradually build up a condition of comparative rigidity as the speed of operation of the motor is decreased to the range within which torsional thrusts of substantial magnitude are exerted on the mountings. This construction permits a mounting having a large yieldable capacity to be used so as to answer the requirements of high speed engine operation.

Although but one specific embodiment of this invention has herein been disclosed and described, it will be understood that various changes including the size, shape and arrangement of parts may be made without departing from the spirit of my invention and it is not my intention to limit its scope other than by the terms of the appended claims.

I claim:

1. A motor mounting including a support, a member to be supported, a rubber cushion yieldably connecting said support and said member, a releasable friction element on said member coacting with said support, and actuating mechanism responsive to variations in the speed of operation of said motor for controlling said friction element.

2. In combination, a motor having a pressure lubricating system, a support for said motor, yieldable means connecting said support and motor, variable means for resisting relative movement between said support and said motor, and apparatus having an actuating element connected to said lubricating system for controlling said variable means.

3. In combination, a motor having a pressure lubricating system responsive to variations in the speed of operation of said motor, a support for said motor, yieldable means connecting said support and motor, variable means for resisting relative movement between said support and said motor, and apparatus connected to said lubricating system for releasing said variable means at high speed operation of said motor.

4. In combination, a motor having a lubricating system and a pump for maintaining the lubricant thereof under pressure, a support for said motor, means yieldably connecting said motor and said support, apparatus for retarding relative movement of said support and motor, and mechanism connected with said lubricating system and operable by the pressure of the lubricant therein of said system for varying the retarding force of said apparatus inversely as the speed of operation of said motor.

5. In combination, a motor having a lubricating system and a pump responsive to the speed of operation of said motor for maintaining the lubricant thereof under pressure, a support for said motor, means yieldably connecting said motor and said support, apparatus for retarding relative movement of said support and motor including a pair of frictionally engaged elements, one carried by said support and the other by said motor, and mechanism connected with said lubricating system and operable by the pressure of the lubricant of said system for varying the retarding force of said apparatus inversely as the speed of operation of said motor.

6. In combination, a motor having a lubricating system and means operable by the rotor of said motor for placing lubricant in said system under pressure, a support for said motor, means yieldably connecting said motor and support including a pair of spaced rigid members and an intermediate rubber block, said members being vulcanized to said block, apparatus for retarding relative movement of said members, and mechanism operable by the pressure of the lubricant of said system for rendering said apparatus inoperative at a predetermined operating speed of said rotor.

7. In combination, a motor having a lubricating system and means operable by the rotor of said motor for placing lubricant in said system under pressure, a support for said motor, a pair of motor mountings, one on each side of said motor and each including spaced rigid members and a yieldable connecting member, apparatus associated with each mounting for retarding relative movement of said support and motor, and a pair of bellows, one operatively connected with the retarding apparatus of each motor mounting and each communicating with said lubricant system for controlling said retarding apparatus.

8. In combination, a variable speed motor, a motor mounting including a pair of rigid members, a yieldable member connecting said rigid members, releasable friction mechanism carried by one of said members and coacting with the other member for limiting relative movement between said members, and control apparatus responsive to variations in the speed of operation of said motor for applying and releasing said friction mechanism at predetermined motor speeds.

9. In combination, a variable speed motor, a motor mounting including a pair of rigid members, means yieldably connecting said members so as to allow a limited movement of one member with respect to the other, a releasable shoe on one member having a friction element thereon engageable with the other member for resisting relative movements of said members, and apparatus responsive to variations in the speed of operation of said motor for controlling said shoe.

10. In combination, a variable speed motor, a supporting frame therefor, motor mountings each including a pair of yieldable connecting members, one member of each mounting being secured to said frame and the other to said motor so as to allow relative movement between said frame and said motor, variable means for opposing the movement of said motor with respect to said frame, and control apparatus for said variable means having an actuating element responsive to varitions in the speed of operation of said motor.

11. In combination, a variable speed motor, a supporting frame therefor, yieldable means connecting said motor and frame, a variable friction member for resisting relative movement between said motor and frame, and control apparatus for said friction member having an actuating member responsive to variations in the speed of operation of said motor for predetermining the force applied on said friction means with respect to the speed of operation of said motor.

12. In combination, a variable speed motor, a supporting frame therefor, a mounting for securing said motor to said supporting frame including a pair of rigid members and a yieldable connecting element, said mounting being adapted to permit relative movement of said frame and said member, a shoe movably mounted on one of said members having a friction element thereon engageable with the other member for resisting relative movement of said motor and frame, means normally urging said shoe toward said latter member, and apparatus responsive to variations in the speed of operation of said motor for gradually releasing said shoe as the speed of operation of said motor is increased.

13. In combination, a motor having a pressure lubricating system responsive to variations in the speed of operation of said motor, a supporting frame therefor, a mounting for securing said motor to said supporting frame including a pair of rigid members and a yieldable connecting element, said mounting being adapted to permit relative movement of said frame and motor, a shoe on one of said members having a friction element thereon engageable with the other member for resisting relative movement of said motor and frame, means normally urging said shoe toward said latter member, and apparatus having an actuating member connected with said lubricating system and subjected to the pressure thereof for gradually releasing said shoe as the speed of operation of said motor is increased.

14. In a mounting for securing a vibration generator to a base, in combination, a part secured to said generator, a part secured to said base, an elastically reformable element connecting said parts and being so constructed and arranged that said element is subjected to both shear and compression stresses on relative movement of said parts, and friction means on the two parts slidably engaging in a plane parallel to the plane of major shear stress.

ROGER K. LEE.

---

CERTIFICATE OF CORRECTION.

Patent No. 1,980,541.            November 13, 1934.

ROGER K. LEE.

It is hereby certified that error appears in the printed specification of the above numbered patent requiring correction as follows: Page 3, line 45, claim 10, for "varitions" read variations; and line 117, claim 14, for "reformable" read deformable; and that the said Letters Patent should be read with these corrections therein that the same may conform to the record of the case in the Patent Office.

Signed and sealed this 9th day of April, A. D. 1935.

(Seal)                                          Leslie Frazer
                                                       Acting Commissioner of Patents.

operative at a predetermined operating speed of said rotor.

7. In combination, a motor having a lubricating system and means operable by the rotor of said motor for placing lubricant in said system under pressure, a support for said motor, a pair of motor mountings, one on each side of said motor and each including spaced rigid members and a yieldable connecting member, apparatus associated with each mounting for retarding relative movement of said support and motor, and a pair of bellows, one operatively connected with the retarding apparatus of each motor mounting and each communicating with said lubricant system for controlling said retarding apparatus.

8. In combination, a variable speed motor, a motor mounting including a pair of rigid members, a yieldable member connecting said rigid members, releasable friction mechanism carried by one of said members and coacting with the other member for limiting relative movement between said members, and control apparatus responsive to variations in the speed of operation of said motor for applying and releasing said friction mechanism at predetermined motor speeds.

9. In combination, a variable speed motor, a motor mounting including a pair of rigid members, means yieldably connecting said members so as to allow a limited movement of one member with respect to the other, a releasable shoe on one member having a friction element thereon engageable with the other member for resisting relative movements of said members, and apparatus responsive to variations in the speed of operation of said motor for controlling said shoe.

10. In combination, a variable speed motor, a supporting frame therefor, motor mountings each including a pair of yieldable connecting members, one member of each mounting being secured to said frame and the other to said motor so as to allow relative movement between said frame and said motor, variable means for opposing the movement of said motor with respect to said frame, and control apparatus for said variable means having an actuating element responsive to varitions in the speed of operation of said motor.

11. In combination, a variable speed motor, a supporting frame therefor, yieldable means connecting said motor and frame, a variable friction member for resisting relative movement between said motor and frame, and control apparatus for said friction member having an actuating member responsive to variations in the speed of operation of said motor for predetermining the force applied on said friction means with respect to the speed of operation of said motor.

12. In combination, a variable speed motor, a supporting frame therefor, a mounting for securing said motor to said supporting frame including a pair of rigid members and a yieldable connecting element, said mounting being adapted to permit relative movement of said frame and said member, a shoe movably mounted on one of said members having a friction element thereon engageable with the other member for resisting relative movement of said motor and frame, means normally urging said shoe toward said latter member, and apparatus responsive to variations in the speed of operation of said motor for gradually releasing said shoe as the speed of operation of said motor is increased.

13. In combination, a motor having a pressure lubricating system responsive to variations in the speed of operation of said motor, a supporting frame therefor, a mounting for securing said motor to said supporting frame including a pair of rigid members and a yieldable connecting element, said mounting being adapted to permit relative movement of said frame and motor, a shoe on one of said members having a friction element thereon engageable with the other member for resisting relative movement of said motor and frame, means normally urging said shoe toward said latter member, and apparatus having an actuating member connected with said lubricating system and subjected to the pressure thereof for gradually releasing said shoe as the speed of operation of said motor is increased.

14. In a mounting for securing a vibration generator to a base, in combination, a part secured to said generator, a part secured to said base, an elastically reformable element connecting said parts and being so constructed and arranged that said element is subjected to both shear and compression stresses on relative movement of said parts, and friction means on the two parts slidably engaging in a plane parallel to the plane of major shear stress.

ROGER K. LEE.

---

CERTIFICATE OF CORRECTION.

Patent No. 1,980,541.　　　　　　　　　　　　　　　November 13, 1934.

ROGER K. LEE.

It is hereby certified that error appears in the printed specification of the above numbered patent requiring correction as follows: Page 3, line 45, claim 10, for "varitions" read variations; and line 117, claim 14, for "reformable" read deformable; and that the said Letters Patent should be read with these corrections therein that the same may conform to the record of the case in the Patent Office.

Signed and sealed this 9th day of April, A. D. 1935.

Leslie Frazer
Acting Commissioner of Patents.

(Seal)